US012691938B2

(12) United States Patent
Bradley et al.

(10) Patent No.: US 12,691,938 B2
(45) Date of Patent: Jul. 28, 2026

(54) STEERING CENTERING/DAMPING MECHANISM FOR HEAVY-DUTY VEHICLES

(71) Applicant: Hendrickson USA, L.L.C., Schaumburg, IL (US)

(72) Inventors: Andrew L. Bradley, Mount Vernon, OH (US); Scott Kohler, Danville, OH (US); Ken Mutzner, Logan, OH (US); Michael Andrew Power, Granville, OH (US); Michael Sheridan, Lancaster, OH (US); John Slonaker, Granville, OH (US); Andrew J. Westnedge, Granville, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 19/313,993

(22) Filed: Aug. 29, 2025

(65) Prior Publication Data

US 2026/0062052 A1     Mar. 5, 2026

Related U.S. Application Data

(60) Provisional application No. 63/690,549, filed on Sep. 4, 2024.

(51) Int. Cl.
*B62D 7/22* (2006.01)
*B62D 7/18* (2006.01)

(52) U.S. Cl.
CPC ............... *B62D 7/228* (2013.01); *B62D 7/18* (2013.01)

(58) Field of Classification Search
CPC .......... B62D 7/228; B62D 7/18; B62D 7/166; B62D 7/00
See application file for complete search history.

(56) References Cited

U.S. PATENT DOCUMENTS

| | | | | |
|---|---|---|---|---|
| 1,121,818 A | * | 12/1914 | Fitzgerald | B60G 7/005 |
| | | | | 188/205 A |
| 1,223,913 A | * | 4/1917 | Weaver | B62D 7/22 |
| | | | | 280/89.12 |
| 1,317,912 A | | 10/1919 | Dyer | |
| 1,414,737 A | * | 5/1922 | Gulick | B62D 7/22 |
| | | | | 280/93.511 |
| 1,890,766 A | | 12/1932 | Adams | |
| 3,354,982 A | | 11/1967 | Schramm | |
| 3,880,439 A | | 4/1975 | Wolter | |
| 4,084,833 A | | 4/1978 | Mohrbacker et al. | |
| 4,759,563 A | | 7/1988 | Nash | |
| 4,925,165 A | | 5/1990 | Sketo | |
| 7,131,652 B2 | | 11/2006 | Ramsey | |

(Continued)

*Primary Examiner* — Jason D Shanske
*Assistant Examiner* — Matthew Joseph Ganci
(74) *Attorney, Agent, or Firm* — Dureska & Moore, LLC; David P. Dureska; Benjamin J. Chojnacki

(57) ABSTRACT

A steering centering/damping mechanism for a steerable axle/suspension system of a heavy-duty vehicle, the steering centering/damping mechanism comprising a mechanically-operated structure including a torsion spring. The mechanically-operated structure interconnects a tie rod and a steering knuckle of the steerable axle/suspension system and provides increasing positive steering centering force with increasing steer angle of the steerable axle/suspension system.

9 Claims, 8 Drawing Sheets

(56)  References Cited

U.S. PATENT DOCUMENTS

| 8,246,060 | B2 | 8/2012 | Gottschalk et al. |
| 8,616,565 | B1 | 12/2013 | Delorenzis |
| 10,471,988 | B2 | 11/2019 | Westnedge et al. |
| 11,643,140 | B2 | 5/2023 | Gottschalk |
| 2004/0201193 | A1 | 10/2004 | Larson et al. |
| 2009/0179396 | A1 | 7/2009 | Gottschalk |
| 2015/0266507 | A1 | 9/2015 | Westnedge et al. |

* cited by examiner

Outboard          Inboard

Outboard        Inboard

STEERING CENTERING/DAMPING MECHANISM FOR HEAVY-DUTY VEHICLES

CROSS-REFERENCE TO RELATED APPLICATION

This application claims the benefit of U.S. Provisional Ser. No. 63/690,549, filed Sep. 4, 2024.

BACKGROUND OF THE INVENTION

Field of the Invention

The present invention relates generally to the art of steerable axle/suspension systems for heavy-duty vehicles. More particularly, the invention is directed to a mechanical steering centering/damping mechanism for a steerable axle/suspension system for heavy-duty vehicles that utilizes a torsion spring and modified tie rod end to provide a steering centering force that increases with increasing steer angle to reduce tire scrubbing and increase tracking efficiency of the steerable axle suspension/system during heavy-duty vehicle turning.

BACKGROUND ART

The use of auxiliary axle/suspension systems in heavy-duty vehicles is well-known. For the purposes of clarity and convenience, reference is made to a heavy-duty vehicle with the understanding that such reference includes trucks, tractor-trailers or semi-trailers, trailers, and the like. In particular, heavy-duty vehicles typically include multiple axle/suspension systems that are longitudinally-spaced along the heavy-duty vehicle to distribute load and create ride stability. In order to transport the maximum load allowed, federal law requires heavy-duty vehicles to have additional auxiliary axles at specified longitudinal intervals.

Auxiliary axle/suspension systems may be non-liftable or liftable and steerable or non-steerable, depending on the specific application. Steerable and non-steerable liftable auxiliary axle/suspension systems are typically lifted or raised by transversely-spaced suspension assemblies associated with the lift axle, as is known. Liftable auxiliary axle/suspension systems are typically operated by a control system actuated by a switch, commonly referred to as a lift switch, that is manually triggered by an operator of the heavy-duty vehicle. Lift switches traditionally have been installed in the cab of the heavy-duty vehicle for proximity to the operator, preventing the operator from having to exit the cab, which may be particularly inconvenient in circumstances such as inclement weather.

Liftable and non-liftable steerable auxiliary axle/suspension systems are generally located at about the longitudinal center of the heavy-duty vehicle and utilize a single-tire wheel end assembly at the axle ends. For the purposes of clarity and convenience, reference is made to steerable axle/suspension systems with the understanding that such reference may include self-steering, liftable, and non-liftable auxiliary steerable axle/suspension systems. The single tires of the wheel end assemblies of steerable axle/suspension systems each have a large area of contact with the ground.

Steerable axle/suspension systems are generally self-steering, wherein the wheels of such systems turn due to tracking forces imparted on the wheels by the position of the steerable axle/suspension system relative to the tractor during a heavy-duty vehicle turn, as well as the wheels' large area of contact with the road surface, as is known. Because steerable axle/suspension systems are typically self-steering, during a heavy-duty vehicle turn the wheels of the axle/suspension system may experience improper tracking, wherein the wheels of the steerable axle/suspension system do not return to a position that is perpendicular to the heavy-duty vehicle axle, commonly referred to as a zero-steer angle, by the time the heavy-duty vehicle has completed a turn. If the wheels of the steerable axle/suspension system do not return to a zero-steer angle once the heavy-duty vehicle has completed a turn, the wheels may be dragged, or scrubbed, potentially resulting in excessive wear on the tires of the steerable axle/suspension system.

In order to reduce or minimize improper tracking and tire scrubbing during heavy-duty vehicle turns, steerable axle/suspension systems have included prior art steering centering mechanisms that assist the wheels in returning to a zero-steer angle by the time a heavy-duty vehicle completes a turn and is moving in a forward direction. Some prior art steering centering mechanisms have utilized a pair of oil-filled shocks having respective coil-over springs that are connected at one end to a respective arm extending from each steering knuckle, and are connected at a second end to the axle body adjacent the central longitudinal axis of each respective side of the axle/suspension system. In operation, as the heavy-duty vehicle encounters a left turn, the coil-over shock of the prior art steering centering mechanism attached to the knuckle arm on the inside of the heavy-duty vehicle turn radius becomes compressed because the arm of the knuckle rotates inboardly, shortening the distance between the arm and the second end of the shock attached to the axle. Conversely, the coil-over shock attached to the steering knuckle arm on the outside of the heavy-duty vehicle turning radius is extended because the arm of the knuckle rotates outboardly, extending the distance between the arm and the second end of the shock attached to the axle. This extension and compression of the coil-over shocks provides a positive steering centering force that increases as steer angle increases, with equilibrium of the system being achieved when the wheels of the steerable axle/suspension system are at a zero-steer angle, as is known. In addition, the oil and internal valving of the coil-over shocks reduce, or damp, forces that can lead to wobble or shimmy of the steerable axle/suspension system during operation of the heavy-duty vehicle.

Other prior art steering centering mechanisms have attempted to utilize a pneumatically-controlled apparatus that constantly applies a steering centering force to each of the knuckles of the steerable axle/suspension system. Such prior art steering centering mechanisms typically employ an air spring that connects to a pair of locking arms which interface with a bracket clamped to a tie rod. The pressure inside the air spring applies a steering centering force through the tie rod equally to each connected knuckle and can be adjusted for various applications requiring different steering centering forces. Increasing the steer angle of the steerable axle/suspension system compresses the air spring, in turn increasing the centering force.

While satisfactory for their intended purpose, prior art steering centering mechanisms have limitations, disadvantages, and drawbacks. For instance, the coil-over shocks of prior art steering centering mechanisms are considered wear items and progressively lose oil during operation. The lost oil from the coil-over shocks is replaced by air from the environment, potentially reducing or eliminating the damping of the shock. As a result, the coil-over shocks of prior art steering centering mechanisms must be replaced at regular intervals, increasing cost and heavy-duty vehicle downtime.

In addition, the location of the coil-over shocks can potentially have adverse effects on suspension packaging or spacing due to the relatively large size and number of coil-over shocks required for each steerable axle/suspension system.

Moreover, prior art steering centering mechanisms utilizing pneumatically-controlled apparatuses, such as air springs, are not considered mechanically operative in nature. Such prior art steering centering mechanisms have known potential failure modes, such as loss of air pressure due to component failures, air spring wear, and introduction of water, ice, or other contaminants into the system, that can affect the operation and performance of the steerable axle/suspension system. Moreover, the size and complexity of such prior art steering centering mechanisms may have an adverse effect on packaging, potentially limiting the use of such prior art steering centering mechanisms to applications where sufficient space is available, such as those where a heavy-duty vehicle drive shaft is not utilized.

Thus a need exists in the art for a mechanically-operated steering centering/damping mechanism that provides an increasing steering centering force as the steer angle of the heavy-duty vehicle steering assemblies increase while eliminating wear items and reducing the required packaging envelope, thereby reducing wheel wobble at zero-steer angle, decreasing tire scrubbing, increasing tracking efficiency of the steerable axle/suspension system, and reducing weight and complexity of the steering centering/damping mechanism, vehicle downtime, and cost.

SUMMARY OF THE INVENTION

Objectives of the present invention include providing a steering centering/damping mechanism that increases steering centering force as the steer angle of the heavy-duty vehicle steering assemblies increase.

A further objective of the present invention is to provide a steering centering/damping mechanism that eliminates wear items and reduces the required packaging envelope on the heavy-duty vehicle.

Yet another objective of the present invention is to provide a steering centering/damping mechanism that has reduced weight and complexity.

These objectives and advantages are obtained by the steering centering/damping mechanism for a steerable axle/suspension system of a heavy-duty vehicle, according to the present invention, the steering centering/damping mechanism comprising a mechanically-operated structure including a torsion spring. The mechanically-operated structure interconnects a tie rod and a steering knuckle of the steerable axle/suspension system and provides increasing positive steering centering force with increasing steer angle of the steerable axle/suspension system.

BRIEF DESCRIPTION OF THE SEVERAL VIEWS OF THE DRAWINGS

The exemplary embodiment of the present invention, illustrative of the best mode in which Applicant has contemplated applying the principles, is set forth in the following description, shown in the drawings, and particularly and distinctly pointed out and set forth in the appended claims.

Similar reference characters refer to similar parts throughout.

DESCRIPTION OF THE PREFERRED EMBODIMENT

Figure 1:
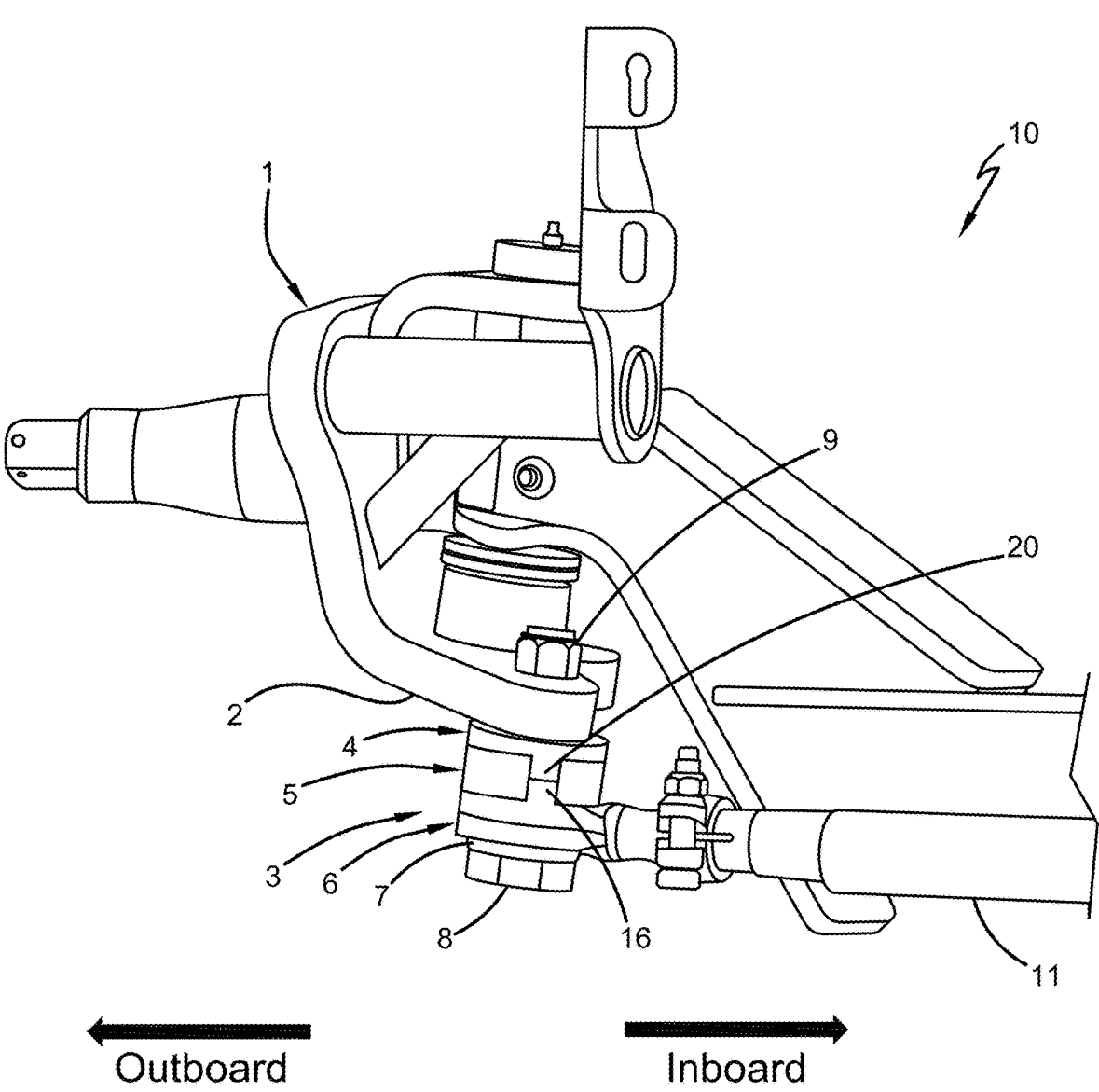
FIG. 1 is a fragmentary perspective view of a portion of a steerable axle/suspension system incorporating an exemplary embodiment steering centering mechanism, according to the present invention.
Figure 2:
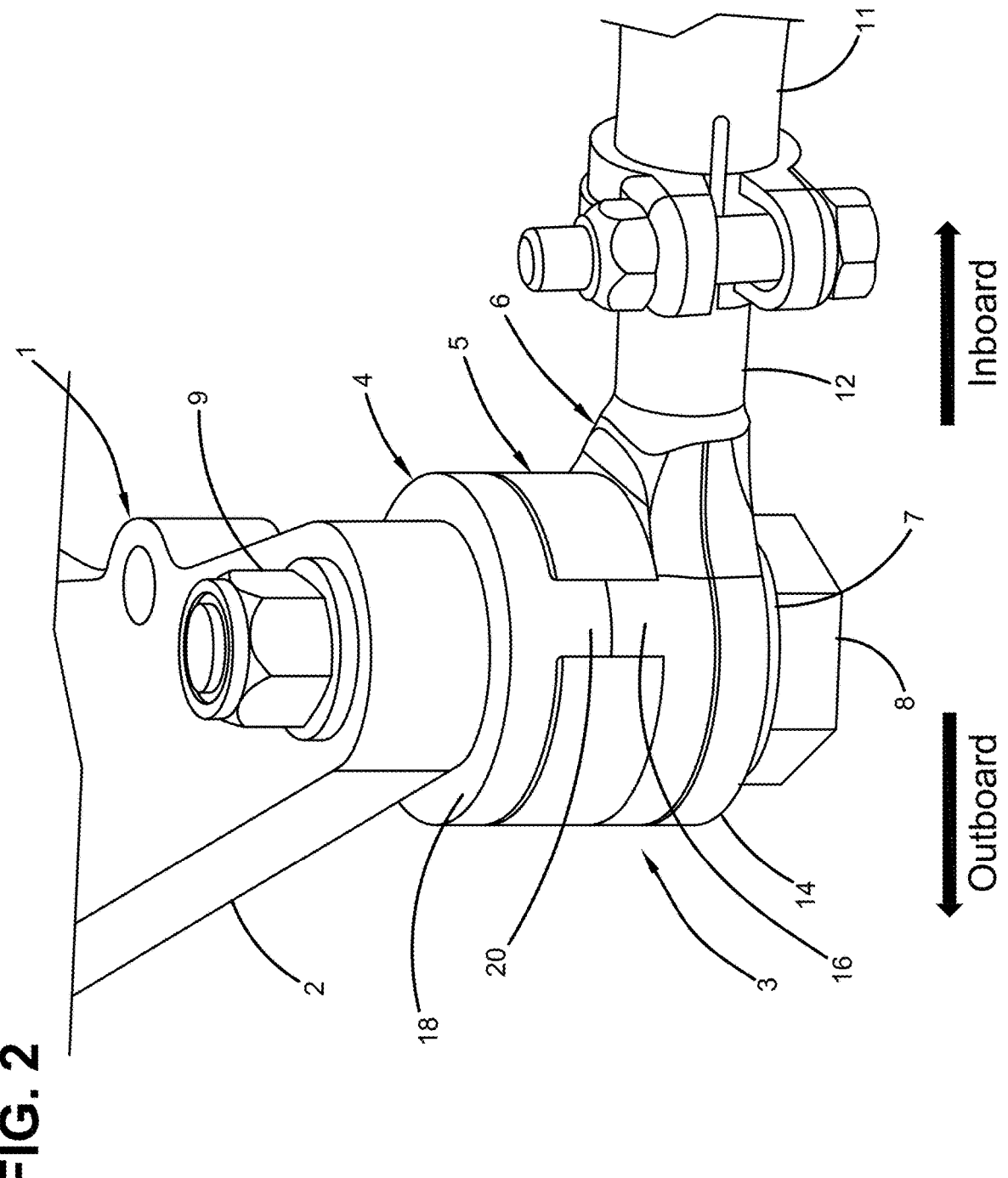
FIG. 2 is an enlarged fragmentary perspective view of the exemplary embodiment steering centering mechanism shown in FIG. 1, showing the mechanism in a low-energy state.
Figure 3:
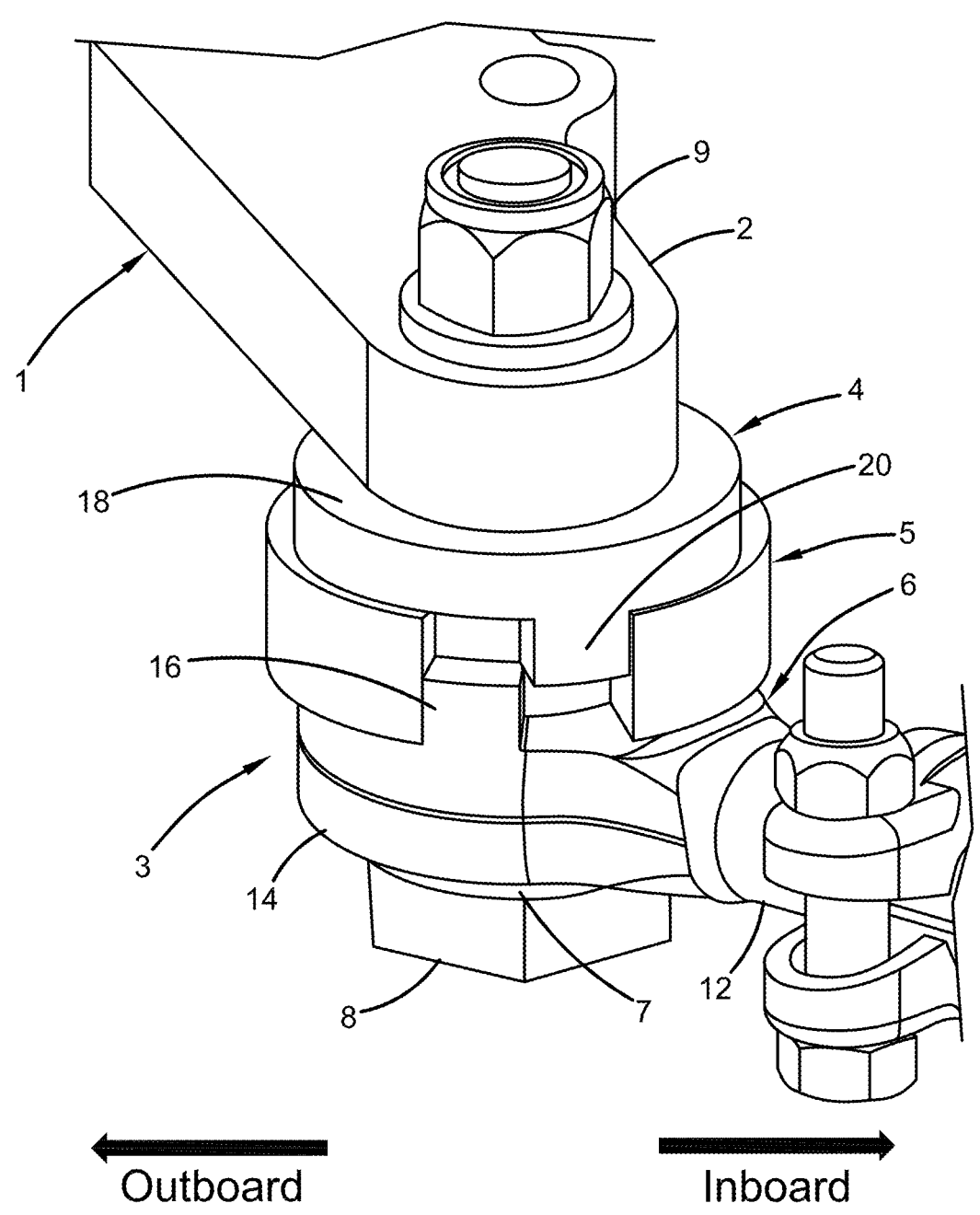
FIG. 3 is an enlarged fragmentary perspective view of the exemplary embodiment steering centering mechanism shown in FIG. 1, showing the mechanism in an activated state.
Figure 4:
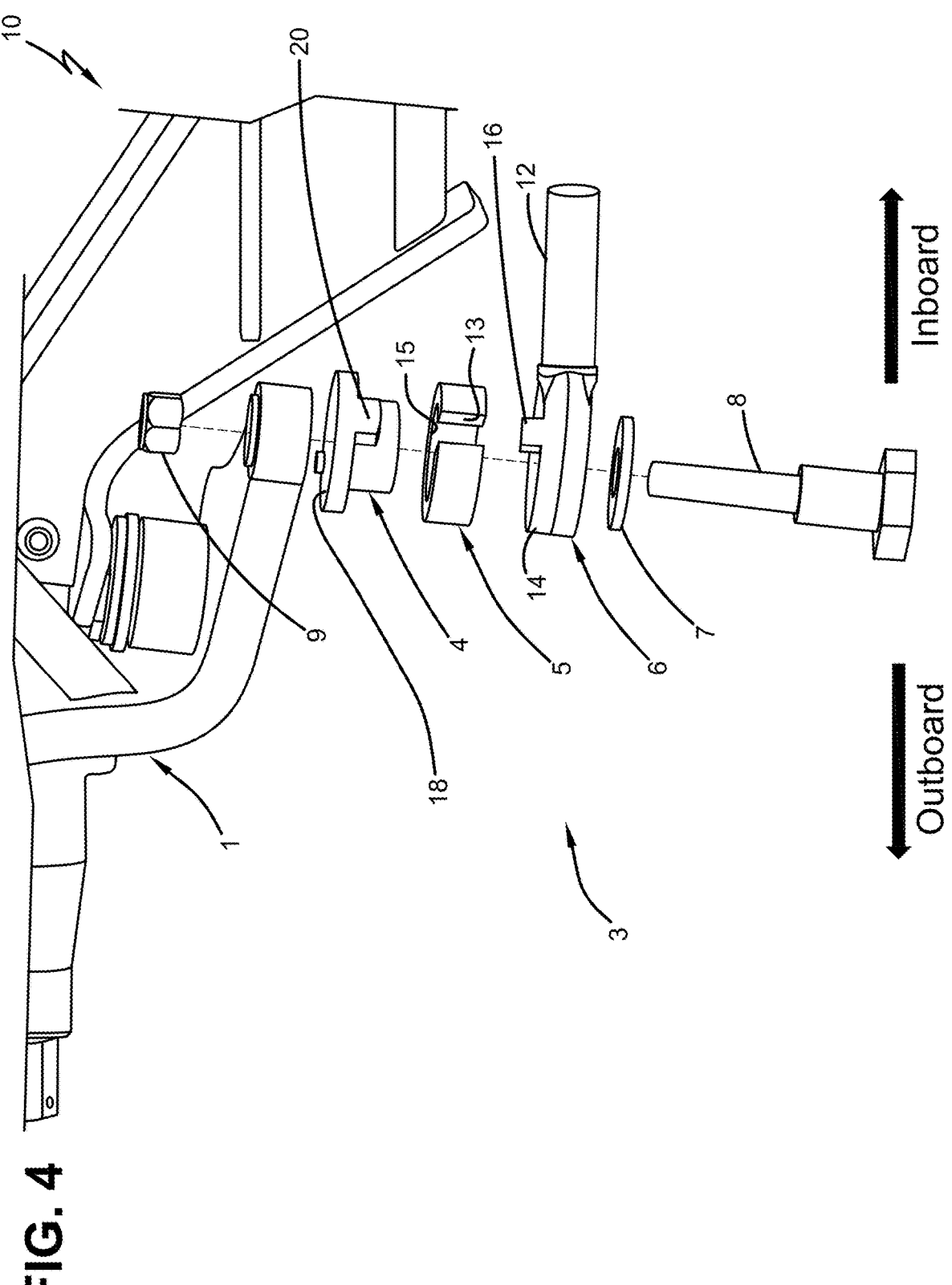
FIG. 4 is a fragmentary exploded view of the exemplary embodiment steering centering mechanism shown in FIGS. 1-3.

An exemplary embodiment mechanically-operated, steering centering/damping mechanism 3 (FIGS. 1-5), according to the present invention, may be incorporated into any suitable steerable axle/suspension system 10 (partially shown) for heavy-duty vehicles (not shown). Steerable axle/suspension system 10 may include a pair of steering knuckles 1 (only one shown), each having a respective arm 2 (only one shown) extending inboardly and rearwardly of the knuckle, as is known. A tie rod 11 (partially shown) extends between and is connected to respective arms 2 of knuckles 1.

In accordance with an important aspect of the present invention, tie rod 11 is connected at least to one of arms 2 of respective knuckles 1 by exemplary embodiment steering centering/damping mechanism 3 to provide steerable axle/suspension system 10 with increasing steering force as steering angle of the wheels (not shown) of the axle/suspension system increases. In particular, tie rod 11 may have a modified tie rod end 6 attached or connected to the tie rod using any suitable means, such as welding, bracketry, or the like. Tie rod end 6 may include an inboard, cylindrical or tubular portion 12 (FIG. 2) for inserting into or engaging tie rod 11 and an outboard portion 14. Outboard portion 14 of tie rod end 6 is generally eyelet shaped having an annular form that tapers toward inboard cylindrical portion 12 and a central opening (not shown). The lower surface of outboard portion 14 may be generally flat. The upper surface of outboard portion 14 may also be flat and includes a prismatic projection, or key 16, extending upward from the upper surface.

In accordance with another important aspect of the present invention, exemplary embodiment steering centering/ damping mechanism 3 includes a torsion spring 5 connected to tie rod end 6 and engaging key 16 on the upper surface of the tie rod end. In particular, torsion spring 5 may be formed as a generally semi-circular or semi-annular band having a central opening 15 (FIG. 4) and a gap 13. Torsion spring 5 may be formed with any suitable dimensions and/or spring constant. More particularly, torsion spring 5 may be disposed over the upper surface of outboard portion 14 of tie rod end 6 such that central opening 15 of the torsion spring aligns with the central opening of the outboard portion and such that key 16 is disposed within gap 13 of the torsion spring.

Figure 5:
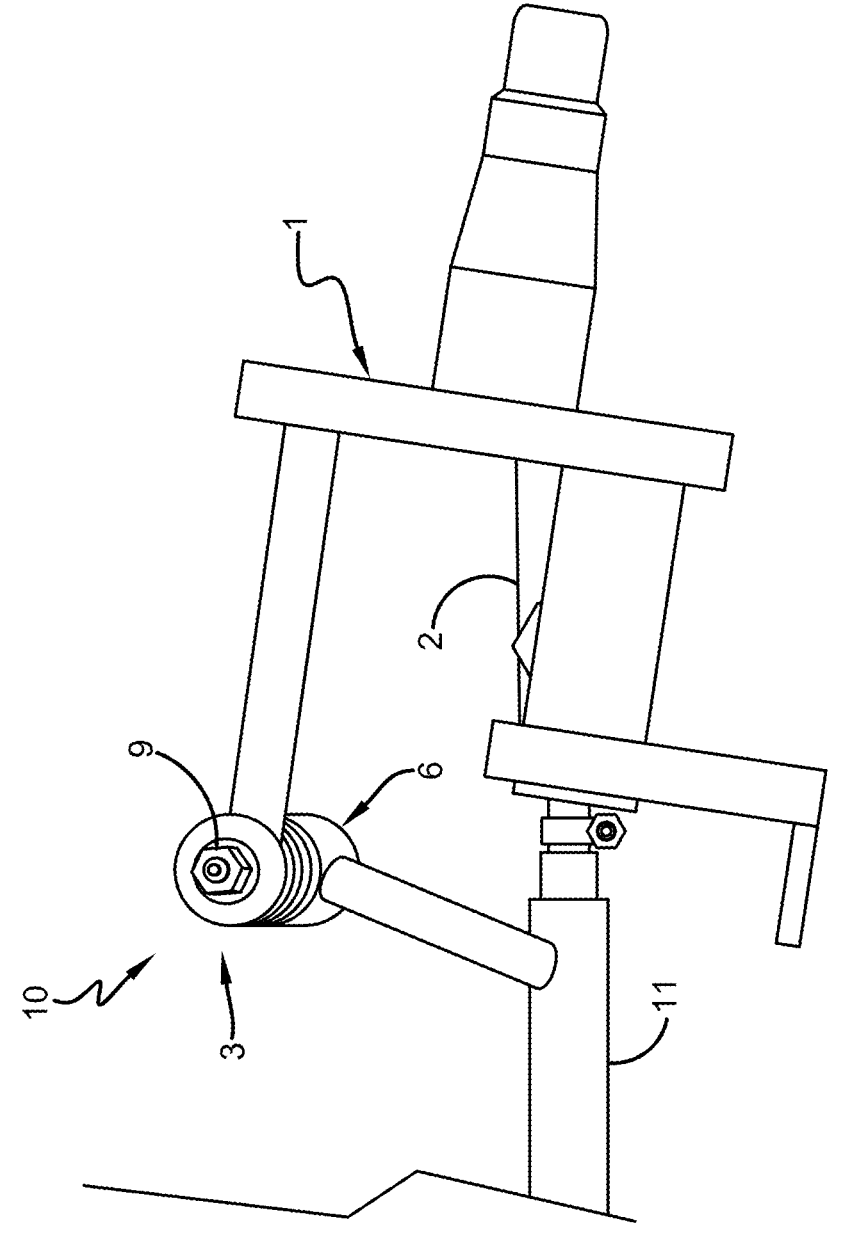
FIG. 5 is a fragmentary elevational view of the exemplary embodiment steering centering mechanism shown in FIG. 1, showing an alternative arrangement with the mechanism mounted indirectly between the tie rod and the steering knuckle.

In accordance with an important aspect of the present invention, exemplary embodiment steering centering/damping mechanism 3 also includes an index bushing 4 disposed between arm 2 of knuckle 1 and torsion spring 5. In particular, bushing 4 may be formed from any suitable material as generally tubular with a central opening (not shown) extending through the bushing along a central axis (not shown). Bushing 4 may also be formed with a flange 18 extending radially-outward from the bushing and having a prismatic projection 20 integrally formed with the bushing and the flange. Projection 20 may extend downwardly from flange 18 along bushing 4 and have a similar shape as key 16 of outboard portion 14 of tie rod end 6. More particularly, bushing 4 may be at least partially disposed within torsion spring 5 such that flange 18 of the bushing contacts the upper surface of the torsion spring and projection 20 is disposed within gap 13 and in contact with key 16. A washer 7 may be disposed against the lower surface of outboard portion 14 of tie rod end 6 such that the central opening (not shown) of the washer is aligned with the central opening of the outboard portion. A fastener, such as shoulder bolt 8, may be disposed through the aligned openings and through an opening in arm 2 of knuckle 1 and secured by a nut 9 to attach steering centering/damping mechanism 3 to steerable axle/suspension system 10. It is also contemplated that steering centering/damping mechanism 3 may be indirectly attached between arm 2 or knuckle 1 and tie rod 11, as shown in FIG. 5, using any suitable bracketry.

Figure 6:
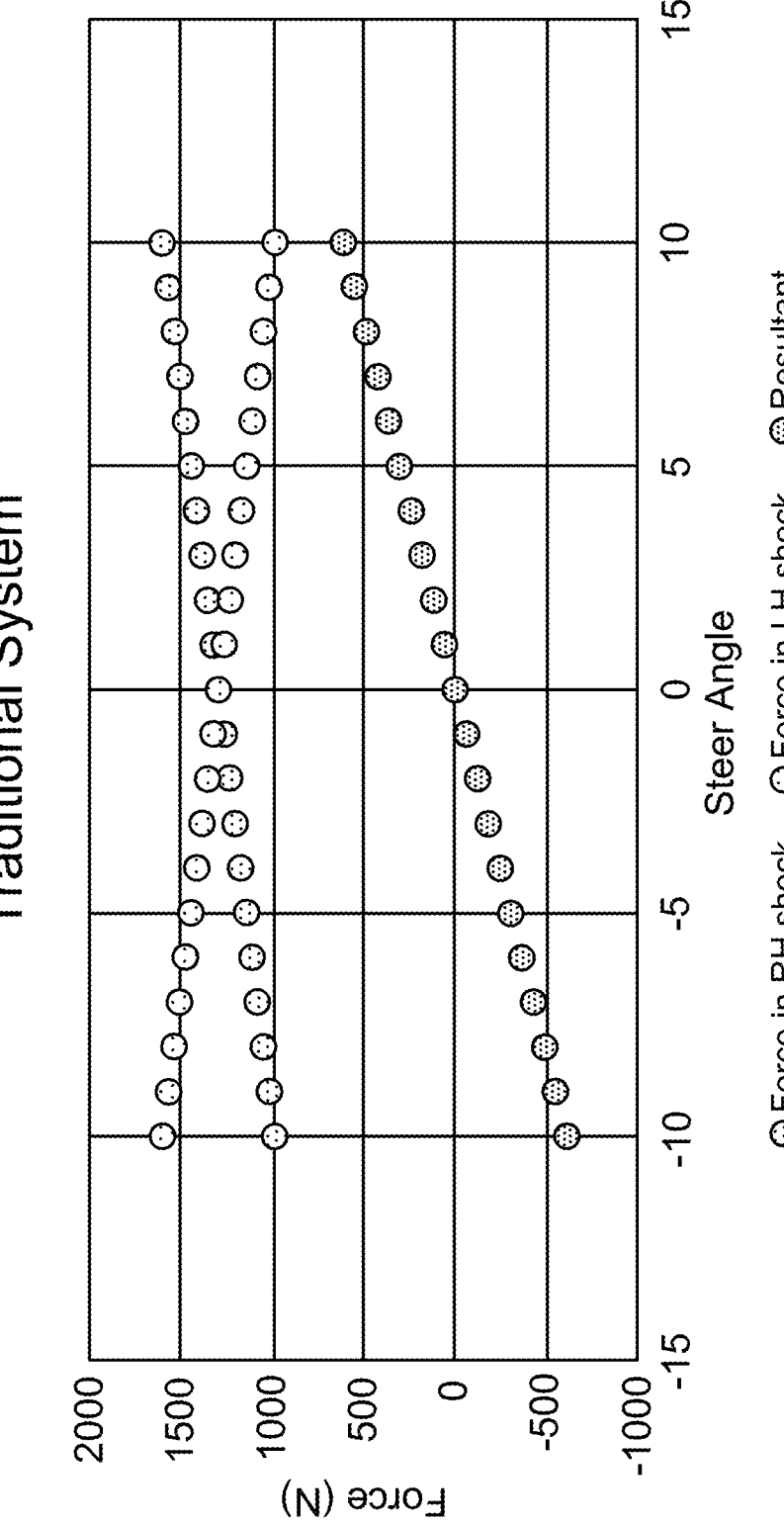
FIG. 6 is a graph showing the forces relative to steer angle in steerable axle/suspension systems incorporating prior art steering centering mechanisms.
Figure 7:
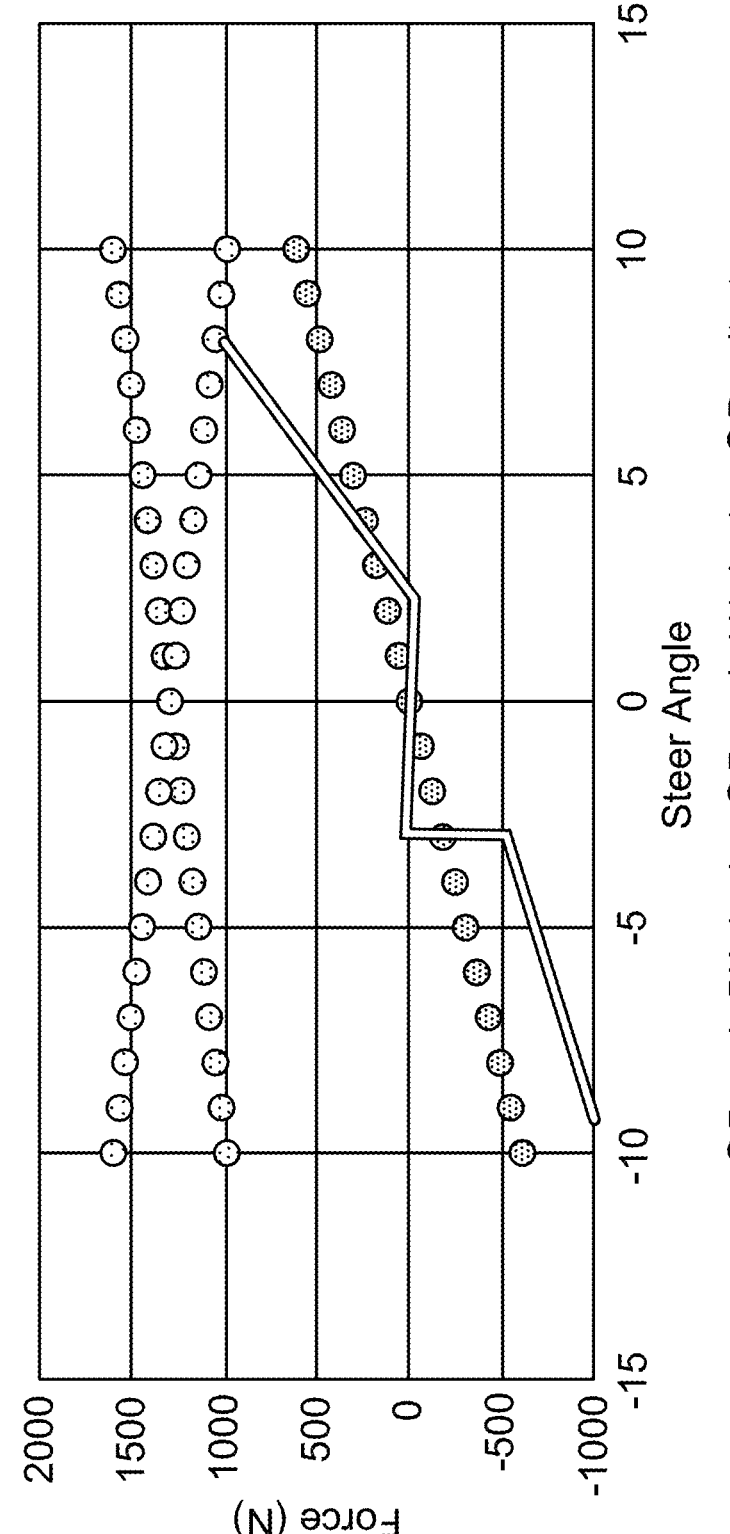
FIG. 7 is a graph showing the forces relative to steer angle in steerable axle/suspension systems incorporating the exemplary embodiment steering centering mechanism compared to prior art steering centering mechanisms.
Figure 8:
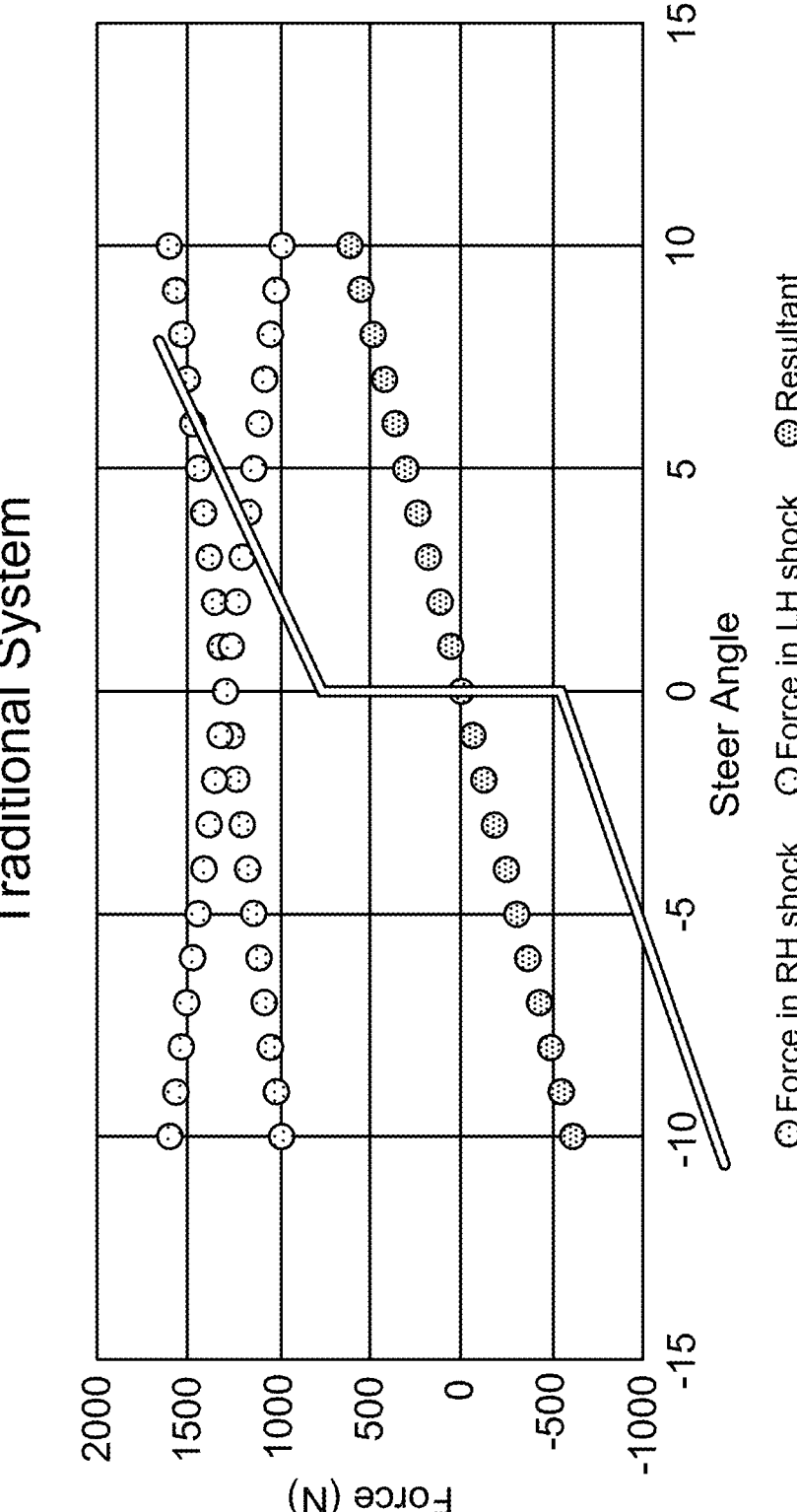
FIG. 8 is a graph showing the forces relative to steer angle in steerable axle/suspension systems incorporating the exemplary embodiment steering centering mechanism where the mechanism has been enhanced to provide preload around the steering center point compared to prior art steering centering mechanisms.

In operation, a single exemplary embodiment steering centering/damping mechanism 3 may provide centering force to steerable axle/suspension system 10 similar to that of prior art steering centering mechanisms, as shown in FIGS. 6-8. When the heavy-duty vehicle turns, contact between the wheels of steerable axle/suspension system 10 and the ground as well as the relative position between the steerable axle/suspension system and the tractor (not shown) of the heavy-duty vehicle applies a force to the wheels that increases the steer angle of the wheels, and thus rotation of the knuckles 1 to which the wheels are attached. Rotation of knuckle 1 to which steering centering/damping mechanism 3 is attached causes rotation of arm 2 of the knuckle relative to tie rod end 6 of tie rod 11. As a result, key 16 of tie rod end 6 applies a force acting on torsion spring 5, elastically deforming the torsion spring. Torsion spring 5, in turn applies a force to key 16 of tie rod end 6 that increases in proportion to the amount the torsion spring is extended, thus increasing the centering force applied to both arms 2, and thus knuckles 1 and the wheels attached to the knuckles, through tie rod 11.

Exemplary embodiment steering centering/damping mechanism 3 of the present invention provides steerable axle/suspension systems for heavy-duty vehicles, such as steerable axle/suspension system 10, with a steering centering force that increases with increasing steer angle without the use of coil-over shocks or air springs, decreasing the potential for tire scrubbing and increasing the tracking efficiency of the steerable axle/suspension system during a heavy-duty vehicle turn. Minimization of tire scrubbing and lack of coil-over shocks or air springs allows exemplary embodiment steering centering/damping mechanism 3 of the present invention to reduce complexity and space requirements of steerable axle/suspension systems and eliminates potential failure modes of pneumatically controlled devices, which may include loss of air pressure due to a variety of component failures, wear of the air spring, and introduction of water, ice or other contaminants into the system, affecting the performance of the system, thereby reducing maintenance, vehicle downtime, and cost.

It is to be understood that the structure and arrangements of the above-described preferred embodiment steering centering/damping mechanism 3 for heavy-duty vehicles of the present invention may be altered or rearranged without affecting the overall concept or operation of the invention. In addition, steering centering/damping mechanism 3 of the present invention may be utilized in vocational truck applications as well as trailer applications. It is also to be understood that preferred embodiment steering centering/damping mechanism 3 of the present invention may be employed with other types of axles, wheel end assemblies, and axle/suspension systems than those shown and described above, such as trailing and leading arm axle/suspension systems, and liftable and non-liftable axle/suspension systems, without affecting the overall concept or operation of the invention. It is even further understood that steering centering/damping mechanism 3 of the present invention could be automated or manually operated without changing the overall concept or operation of the present invention. It is to be understood that different shapes, materials, and sizes could be utilized for the components of preferred embodiment steering centering/damping mechanism 3 of the present invention without changing the overall concept or operation of the present invention. It is also to be understood that preferred embodiment steering centering/damping mechanism 3 could utilize mechanically operated structures different from those shown and described above to provide a steering centering force that increases with increasing steer angle without affecting the overall concept or operation of the present invention.

Accordingly, steering centering/damping mechanism 3 of the present invention is simplified; provides an effective, safe, inexpensive, and efficient structure and method, which achieves all the enumerated objectives; provides for eliminating difficulties encountered with prior art steering centering mechanisms; and solves problems and obtains new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the description and illustrations of the invention are by way of example, and the scope of the invention is not limited to the exact details shown or described.

Having now described the features, discoveries, and principles of the invention; the manner in which the regulators are used and installed; the characteristics of the construction, arrangement, and method steps; and the advantageous, new, and useful results obtained, the new and useful structures, devices, elements, arrangements, process, parts, and combinations are set forth in the appended claims.

What is claimed is:

1. A steering centering/damping mechanism for a steerable axle/suspension system of a heavy-duty vehicle, said steering centering/damping mechanism comprising:

a mechanically-operated structure including a torsion spring, said torsion spring having a vertically-extending gap, said mechanically operated structure being interconnected with a tie rod and a steering knuckle of said steerable axle/suspension system, said tie rod having a first end portion formed with a first projection extending upwardly and engaging said gap to elastically deform the torsion spring and provide increasing positive steering centering force with increasing steer angle of the steerable axle/suspension system.

2. The steering centering/damping mechanism according to claim 1, said tie rod further comprising a second end portion; and said first end portion being formed with an eyelet having a planar upper surface.

3. The steering centering/damping mechanism according to claim 2, said torsion spring being formed as a semi-annular band disposed against said upper surface of said eyelet.

4. The steering centering/damping mechanism according to claim 3, said first projection extending upwardly from said upper surface of said eyelet.

5. The steering centering/damping mechanism according to claim 4, said mechanically operated structure further comprising a bushing having a radially-outward extending flange, said busing being at least partially received within said eyelet, said flange being in contact with said torsion spring.

6. The steering centering/damping mechanism according to claim 5, said bushing further comprising a second projection extending radially outward from said busing and downward from said flange.

7. The steering centering/damping mechanism according to claim 6, said gap of said torsion spring engaging said second projection of said bushing;

wherein said first and the second projections cooperate to apply a force to the torsion spring, elastically deforming the torsion spring during turning events of said steerable axle/suspension system.

8. The steering centering/damping mechanism according to claim 7, said mechanically operated structure further comprising a fastener disposed through said eyelet, said torsion spring, and said bushing.

9. The steering centering/damping mechanism according to claim 8, said fastener also being disposed through an arm of said knuckle of said steerable axle/suspension system.

* * * * *